United States Patent
Klesyk et al.

(10) Patent No.: US 10,186,896 B2
(45) Date of Patent: Jan. 22, 2019

(54) FLEXIBLE POWER LIMIT INVERTER

(71) Applicant: LEAR CORPORATION, Southfield, MI (US)

(72) Inventors: Krzysztof Klesyk, Novi, MI (US); Raef Aidibi, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 1096 days.

(21) Appl. No.: 14/473,276

(22) Filed: Aug. 29, 2014

(65) Prior Publication Data

US 2016/0059803 A1 Mar. 3, 2016

(51) Int. Cl.
| | |
|---|---|
| *H02J 7/14* | (2006.01) |
| *B60L 1/00* | (2006.01) |
| *H02J 7/00* | (2006.01) |
| *H02M 7/48* | (2007.01) |

(52) U.S. Cl.
CPC ............ *H02J 7/1438* (2013.01); *B60L 1/006* (2013.01); *H02J 7/0063* (2013.01); *B60L 2210/40* (2013.01); *B60L 2240/36* (2013.01); *B60L 2240/547* (2013.01); *B60L 2260/26* (2013.01); *H02M 7/48* (2013.01); *Y02T 10/7241* (2013.01)

(58) Field of Classification Search
None
See application file for complete search history.

(56) References Cited

U.S. PATENT DOCUMENTS

| | | | |
|---|---|---|---|
| 6,157,555 A | 12/2000 | Hemena et al. | |
| 8,304,929 B2 | 11/2012 | Sweet et al. | |
| 2008/0234096 A1* | 9/2008 | Joshi | B60K 6/46 477/3 |
| 2009/0257164 A1* | 10/2009 | Ikeuchi | H02J 7/0031 361/91.5 |
| 2010/0133900 A1* | 6/2010 | King | B60L 11/1816 307/9.1 |
| 2010/0259098 A1 | 10/2010 | Huang et al. | |

(Continued)

FOREIGN PATENT DOCUMENTS

| | | |
|---|---|---|
| DE | 10107023 A1 | 8/2002 |
| DE | 102010029971 A1 | 12/2011 |

(Continued)

OTHER PUBLICATIONS

German Office Action for Application No. 10 2015 215 459.9, dated Dec. 11, 2017, 7 pages.

*Primary Examiner* — Thienvu Tran
*Assistant Examiner* — David M Stables
(74) *Attorney, Agent, or Firm* — Brooks Kushman P.C.

(57) ABSTRACT

In at least one embodiment, an apparatus comprising a vehicle inverter is provided. The vehicle inverter is programmed to invert a direct current (DC) input into a maximum alternating current (AC) output to power at least one external load and to receive first information indicative of whether a vehicle is in one of a drive mode and a park mode. The vehicle inverter is further programmed to provide the maximum AC output to the power the at least one external load in response to the information indicating that the vehicle is in the park mode and to invert the DC input into a first AC output that is less than the maximum AC output to power the at least one external load in response to the information indicating that the vehicle is in the drive mode.

19 Claims, 5 Drawing Sheets

(56) References Cited

U.S. PATENT DOCUMENTS

| | | |
|---|---|---|
| 2010/0320836 A1 | 12/2010 | Sweet et al. |
| 2013/0231811 A1 | 9/2013 | Aoki |
| 2013/0264865 A1 | 10/2013 | Sugeno et al. |
| 2013/0332753 A1 | 12/2013 | Varma et al. |
| 2013/0338862 A1 | 12/2013 | Guerin et al. |
| 2014/0232179 A1 | 8/2014 | Hirasawa et al. |

FOREIGN PATENT DOCUMENTS

| | | |
|---|---|---|
| WO | 2013001501 A1 | 1/2013 |
| WO | 2014038966 A1 | 3/2014 |

\* cited by examiner

FLEXIBLE POWER LIMIT INVERTER

TECHNICAL FIELD

Aspects as disclosed herein generally relate to a flexible power limit inverter as used in connection with various power consumer electronic devices in a vehicle.

BACKGROUND

U.S. Publication No. 20100320836 (the '836 publication) to Sweet et al. provides an inverter that is configured for use within a vehicle to power consumer electronic devices and other types of devices requiring single-phase, AC energy. The inverter may include a network interface or other type of connection to a vehicle data bus or other message exchange system in order to communicate with an electronic control unit (ECU) or other feature included within the vehicle to monitor and control energy consumption by one or more vehicle subsystems.

U.S. Publication No. 20100259098 (the '098 publication) to Huang et al. provides an inverter for inverting DC power, such as but not limited to the type commonly employed in vehicle power systems, in to AC power, such as but not limited to the type commonly employed to power consumer electronic devices. The inverter may be configured to electrically isolate primary and secondary stages without requiring separate primary and secondary stage power supplies.

SUMMARY

In at least one embodiment, an apparatus comprising a vehicle inverter is provided. The vehicle inverter is programmed to invert a direct current (DC) input into a maximum alternating current (AC) output to power at least one external load and to receive first information indicative of whether a vehicle is in one of a drive mode and a park mode. The vehicle inverter is further programmed to provide the maximum AC output to power the at least one external load in response to the information indicating that the vehicle is in the park mode and to invert the DC input into a first AC output that is less than the maximum AC output to power the at least one external load in response to the information indicating that the vehicle is in the drive mode.

In at least another embodiment, a method is provided that includes inverting a direct current (DC) input into a maximum alternating current (AC) output to power at least one external load and receiving information indicative of whether a vehicle is in one of a drive mode and a park mode. The method further includes providing the maximum AC output to power the at least one external load in response to the information indicating that the vehicle is in the park mode and inverting the DC input into a first AC output that is less than the maximum AC output to power the at least one external load in response to the information indicating that the vehicle is in the drive mode.

In at least another embodiment, an apparatus comprising a vehicle inverter is provided. The vehicle inverter is programmed to invert a direct current (DC) input into a maximum alternating current (AC) output to power at least one external load and to determine whether the DC input as provided from a battery is within a predetermined voltage range including a first predetermined threshold and a second predetermined threshold. The first predetermined threshold being less than the second predetermined threshold. The vehicle inverter is further configured to invert the DC input into a first AC output that is less than the maximum AC output to power at least one external in response to the DC input being less than the first predetermined threshold and to disable inverting the DC input in response to the DC input being greater than the second predetermined threshold.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Inverters are generally provided in vehicles to invert a DC based voltage as provided by a vehicle battery into AC voltage (or AC power) for powering various power consumer electronic devices (e.g., cell phone, laptops, vacuum cleaners, cooking appliances (e.g., blenders) used in connection with tailgates, etc.), and entertainment devices (e.g., big screen televisions also used in connection with tailgates, etc.), etc. In general, automotive systems may have limited power supply capabilities and various power consumer electronic devices are now requiring more power from the vehicle in order to operate (i.e., high power inverters to provide such power). These high power inverters may provide various issues that affect other vehicle subsystems. For example, when a high power consumer electronic device(s) is electrically coupled to the vehicle for receiving power therefrom to either charge or operate, an additional amount of current draw (e.g., 43 Amps) from the various consumer electronic devices may be enough to draw a total current draw of the vehicle past the operating capability of an alternator in the vehicle. Additionally, start/stop functionality of an engine in the vehicle may be affected due to such an increase in current draw. This condition may prevent the engine from restarting during the start operation of the start/stop functionality. Further, vehicle wiring capabilities can only support a limited amount of current. Thus, vehicle operation at lower voltage levels may exceed current requirements. Finally, with an increase in current draw due to the presence of the power consumer electronic device(s) being electrically coupled to the vehicle, vehicle system voltage drops may be excessive and negatively affect operation of the vehicle system.

The present disclosure provides an inverter that inverts a DC input into an AC output to any number of the power consumer electronic devices. The inverter may incorporate any number of voltage output limits based on various vehicle modes to prevent degradation of vehicle operations at various moments and to prevent damage to electronic components based on temperature. For example, the inverter may provide an adjustable power limit (e.g., 0 W to a predefined power maximum (such as but not limited to, 400 W)). The inverter may adjust its power output thereof based on hard coded thresholds, look up tables, temperature, and/or system conditions (e.g., voltage drops and/or modes of vehicle operations), etc. The inverter may provide for a flexible interface to a number of vehicle systems in the vehicle. For example, the inverter may be commanded to output power at a limit of 400 W for one vehicle platform and 300 W for another vehicle platform, and yet 150 W for another vehicle platform, etc. The electronic circuitry of the inverter may support the maximum power capability of the output power. The inverter enables full flexibility and adjustability based on various vehicle modes to prevent degradation of vehicle operations at various moments.

Figure 1:
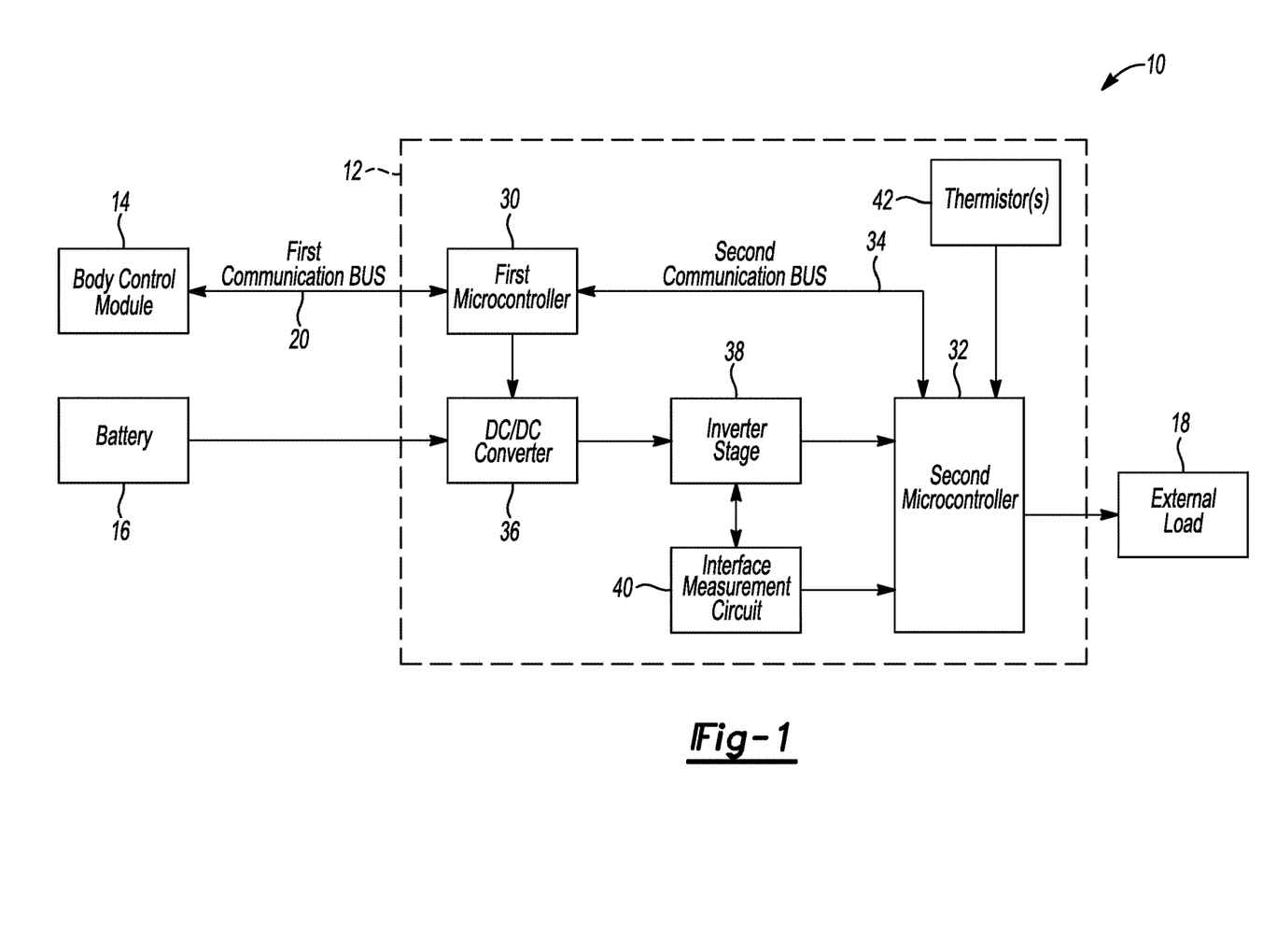
FIG. 1 depicts a vehicle inverter system in accordance to one embodiment.

FIG. 1 depicts a vehicle inverter system 10 in accordance to one embodiment. The system 10 generally includes an inverter 12, a body control module (BCM) 14 and a battery 16. In general, the inverter 12 receives DC voltage from the battery 16 and inverts the DC based voltage into an AC output voltage. One or more external loads (or one or more power consumer electronic devices) 18 may be electrically connected to the inverter 12 for receiving the AC output voltage. As noted above, such power consumer electronic devices 18 may include, but not limited to, a cell phone, laptops, vacuum cleaners, cooking appliances (e.g., blenders) used in connection with tailgates, etc.), and entertainment devices (e.g., big screen televisions also used in connection with tailgates, etc.).

Some of the noted power consumer electronic devices 18 may require a large amount of power in order to operate. Such power demands may negatively impact various operations of a vehicle. As noted above, an alternator in the vehicle may not be able to provide enough current during while the vehicle is in various modes. For example, vehicle operations such as but not limited to start/stop functionality may be adversely impacted by such power demands and vehicle wiring capabilities may be arranged to only handle limited current requirements. Thus, the inverter 12 may adjust the amount of AC output power provided to the power consumer electronic devices 18 based on the vehicle being in particular modes and on an ambient temperature of the inverter 12 to prevent degradation of vehicle operations at various moments and to prevent damage to the electronic components based on temperature and other considerations.

A first communication bus (or data communication bus) 20 enables electrical communication between the inverter 12 and the body control module 14. The first communication bus 20 may be a local interconnect network (LIN) that enables digital transmission of information between the body control module 14 and the inverter 12. It is recognized that the type of data communication bus used to enable communication between the inverter 12 and the body control module 14 may vary based on the desired criteria of a particular implementation. The body control module 14 may transmit data indicative of various vehicle modes to the inverter 12. The inverter 12 may then adjust the power limit for outputting the AC output voltage based on various modes. For example, in the event the vehicle is in a park mode (e.g., vehicle not being driven), the inverter 12 may provide for the delivery of a maximum power (or maximum AC output voltage) to the power consumer electronic devices 18. In this case, the vehicle is not being driven, thus, it may be advantageous to provide peak power to the power consumer electronic devices 18 as a number of vehicle related operations may not be adversely affected. Furthermore, while the vehicle is in the park mode, the vehicle may be used in connection with a tailgate party or other social event where the battery 16 may be used to power high power consumer electronic devices 18 such as blenders (or other kitchen appliances), entertainment systems (e.g., big screen televisions), etc. Such devices 18 generally require higher power to be delivered from the vehicle. Likewise, in the park mode, the vehicle may be used or stationed at a work site and the inverter 12 may be used to power various tools (e.g., rechargeable drills, saws, etc.). The inverter 12 may boost the DC input as provided by the battery 16 to a high AC voltage output (e.g., approximately 400 W) to meet such demands.

In view of the foregoing, the body control module 14 may detect whether the vehicle is in the drive mode or in the park mode and transmit a power limit command over the first communication bus 20 to the inverter 12. The body control module 14 may be operably coupled to other systems in the vehicle for receiving vehicle related information. For example, the body control module 14 may monitor vehicle speed and/or transmission status (e.g., Park, Reverse, Neutral, Drive, and Low) over the first communication bus 20 from other devices (e.g., powertrain control module, transmission control module, etc.) to determine whether the vehicle is being driven. In the event the vehicle is determined to be in a parked state (e.g., no vehicle speed and/or vehicle is in PARK), the body control module 14 may set the power limit for the inverter 12 to the maximum value and transmit a maximum value command to the inverter 12. The inverter 12 in turn may deliver the maximum amount of power that the inverter 12 is capable of providing to the power consumer electronic devices 18 in response to the maximum value command. If on the other hand the vehicle is determined to be in a drive mode (e.g., vehicle speeds exceeds a predetermined value or transmission status in Drive, Reverse, Low, or Neutral), then the battery control module 14 may set the power limit for the inverter 12 to be lower than the maximum value that the inverter 12 is capable of providing to ensure that vehicle operations are not degraded when the inverter 12 powers the power consumer electronic devices 18. It is recognized that the inverter 12 itself may be operably coupled to other systems in the vehicle to determine the mode of the vehicle (e.g., drive or park) and adjust the power limit thereof on its own. In other words, the body control module 14 may be optional.

The body control module 14 may also monitor the amount of voltage that is being provided by the battery 16. In this case, the body control module 14 may adjust or limit the power output of the inverter 12 based on the voltage of the battery 16. In one example, the body control module 14 transmits information over the first communication bus 20 which indicates the amount of voltage that is being provided by the battery 16 to the inverter 12. The inverter 12 then controls the output power to the power consumer electronic devices 18 based on such information. In another example, the inverter 12 may include an input that is configured to monitor the voltage of the battery 16 and may automatically provide a drop in the allowed output power to the power consumer electronic device 18 if a low voltage condition exists at the battery 16. For example, the inverter 12 limits output power if the voltage as provided by the battery 16 falls below a first predetermined threshold to protect wiring within the vehicle from experiencing an increased level of current during a low voltage condition. Likewise, the inverter 12 may monitor the voltage of the battery 16 at the input (or receive information from the body control module 14) and discontinue providing output power if a high voltage condition exists at the battery 16. For example, the inverter 12 may stop providing a power output to the power consumer electronic devices 18 if the voltage as provided by the battery 16 is greater than a second predetermined threshold.

The inverter 12 generally includes a first microcontroller 30 and a second microcontroller 32. A second communication bus 34 is provided to enable communication between the first microcontroller 30 and the second microcontroller 32. The second communication bus 34 may be a serial communications interface (SCI) link that enables serial data exchange between the first microcontroller 30 and the second microcontroller 32. It is recognized that the type of data communication bus 34 used that enables communication between the first microcontroller 30 and the second microcontroller 32 may vary based on the desired criteria of a particular implementation. The second communication bus 34 may be less expensive (or less complex) than the first communication bus 20 as only the first microcontroller 30 and the second microcontroller 32 are communicating thereon and the second communication bus 34 may not need to facilitate the transfer of a large amount of data traffic.

The inverter 12 includes a DC/DC converter 36, an inverter stage 38, and an interface measurement circuit 40. In general, the DC/DC converter 36 boosts the DC voltage from the battery 16 to generate a boosted DC voltage. The DC/DC converter 36 also isolates the boosted DC voltage (or the high DC voltage) from the rest of the vehicle for safety purposes. The first microcontroller 30 controls the DC/DC converter 36 to provide the amount of voltage that is boosted (or generated) at the DC/DC converter 36. The inverter stage 38 inverts the boosted DC voltage to generate the AC output voltage which is then used to power (or charge) the power consumer electronic devices 18. The interface measurement circuit 40 is operably coupled to the inverter stage 38 and the interface measurement circuit 40 and may measure the amount of voltage and current (e.g., power) that is delivered or consumed by the power consumer electronic devices 18.

A plurality of thermistors 42a-42n ("42") is operably coupled to the second microcontroller 32 (or alternatively to the first microcontroller 30). A first thermistor 42 that is coupled to the second microcontroller 32 measures an ambient temperature of air that is flowing internal to the inverter 12. The inverter 12 utilizes the measured ambient temperature for power derating (i.e., reducing the output power from the inverter 12) if the measure ambient temperature exceeds a predetermined temperature value. A second thermistor 42 that is coupled to the second microcontroller 32 measures a temperature of various MOSFETS (or electronics) positioned within the inverter 12 that generate a high voltage. For example, the second thermistor 42 may also be coupled to a first heat sync (not shown) to obtain a temperature therefrom which may be indicative of the temperature for the electronics that generate the high voltage. The inverter 12 utilizes the measured temperature as provided by the second thermistor 42 to protect the MOSFETS (or the electronics) (e.g., disable such electronics) when the temperature about such devices (or the first heat sync) exceeds the first temperature threshold. A third thermistor 42 that is coupled to the second microcontroller 32 measures a temperature of various MOSFETS (or electronics) positioned within the inverter 12 that generate a low voltage. For example, the third thermistor 42 may also be coupled to a second heat sync (not shown) to obtain a temperature therefrom which may be indicative of the temperature for the electronics that generate the low voltage. The inverter 12 utilizes the measured temperature as provided by the third thermistor 42 to protect the MOSFETS (or the electronics) when the temperature about such devices fall exceeds a second temperature threshold. The plurality of thermistors 42 (e.g., first, second and third thermistor) provides the corresponding measured temperature to the second microcontroller 32 (or alternatively to the first microcontroller 30). It is recognized that the inverter 12 may use any number of thermistors 42. In one example, only two thermistors 42 may be used to ascertain the ambient temperature within the inverter 12, the temperature of the electronics that generate the high voltage, and the temperature of the electronics that generate the low voltage. In general, the first microcontroller 30 may control the DC/DC converter 36 to effectively control or limit the amount of power generated by the inverter 12 based on various modes of the vehicle, an ambient temperature of the inverter 12, and/or on the voltage output of the battery 16.

Figure 2:
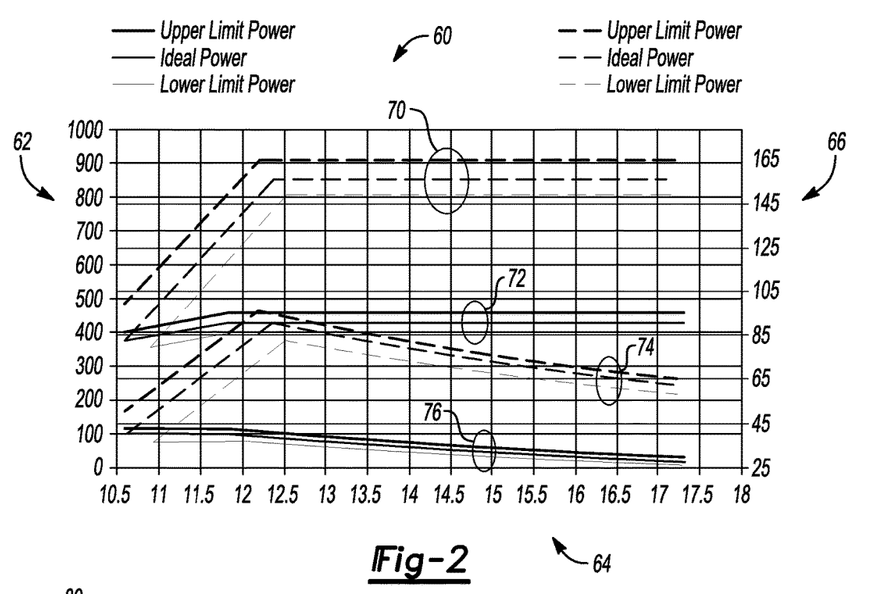
FIG. 2 depicts various waveforms corresponding to a peak and average power output from an inverter, input current to the inverter, and battery voltage in accordance to one embodiment.

FIG. 2 is a plot 60 that depicts various waveforms that correspond to various aspects related to the inverter 12. The plot 60 includes a first legend 62, a second legend 64, and a third legend 66. The first legend 62 generally corresponds to the power level provided by inverter 12 to the power consumer electronic devices 18. The second legend 64 generally corresponds to the voltage of the battery 16. The third legend 66 generally corresponds to an amount of input current provided to the inverter 12 (e.g., from the battery 16).

The plot 60 includes a plurality of first waveforms 70 that illustrate peak power as provided by the inverter 12. The peak power is generally high in order to power the external loads 18 (or the power consumer electronic devices 18) when first electrically coupled to the battery 16. For example, consider the scenario in which a food blender is the power consumer electronic device 18 and the blender is initially turned on to mix food. The blender will consume more power when first turned on in order to driver a motor therein. Once the motor is moving, the peak power will reduce or stabilize. While the first waveforms 70 illustrate a total of three waveforms, the upper waveform and the lower waveform are generally indicative of upper and lower limits due to tolerances within the electronics in the inverter 12 and/or the various power consumer electronic devices 18. The middle waveform of the first waveforms 70 generally represents an ideal condition.

The plot 60 includes a plurality of second waveforms 72 that illustrate an average power output as provided by the inverter 12. In one example, the average output power may be slightly higher than 400 W (e.g., in the event the power output of the inverter 12 is set to such a power limit) and may increase slightly over time based on the voltage of the battery 16. While the second waveforms 72 illustrate a total of three waveforms, the upper waveform and the lower waveform are generally indicative of upper and lower limits due to tolerances of the electronics in the inverter 12 and/or the various power consumer electronic devices 18. The middle waveform of the second waveforms 72 generally represents an ideal condition.

The plot 60 includes a plurality of third waveforms 74 that illustrate a peak current output as provided by the inverter 12. The third waveforms 74 generally track the same trend as the first waveforms 70 and exhibit a general spike or increase due to an in-rush of current into the power consumer electronic device 18. The current may peak for 300 milliseconds and then decrease thereafter. While the third waveforms 74 illustrate a total of three wave forms, the upper waveform and the lower waveform are generally indicative of upper and lower limits due to tolerances within the electronics in the inverter 12 and/or the various power consumer electronic devices 18. The middle waveform of the third waveforms 74 generally represents an ideal condition.

The plot 60 includes a plurality of fourth waveforms 76 that illustrate an average current output as provided by the inverter 12 to the power consumer electronic devices 18. The average current output as provided by the inverter 12 is the amount of current that can be drawn out of the inverter 12 for long durations. While the fourth waveforms 74 illustrate a total of three wave forms, the upper waveform and the lower waveform are generally indicative of upper and lower limits due to tolerances within the electronics in the inverter 12 and/or the various power consumer electronic devices 18. The middle waveform of the fourth waveforms 76 generally represents an ideal condition. The peak current output is generally drawn when the load 18 is started. As such, the power rating for the vehicle (and mode derating) may be performed using the average power output and thus the average current output.

Figure 3:
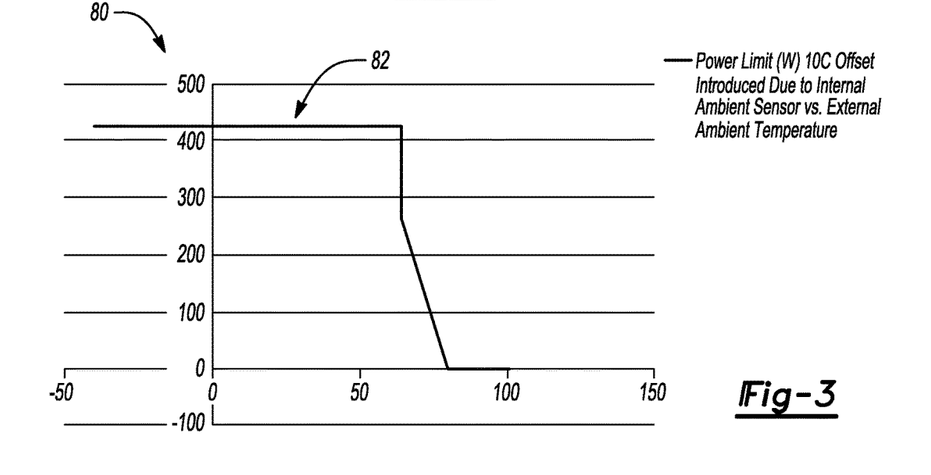
FIG. 3 depicts an output from the inverter to at least one power consumer device based on an amount of measured temperature in accordance to one embodiment.

FIG. 3 provides a plot 80 illustrating a power output from the inverter 12 to the power consumer electronic devices 18 based on an amount of measured temperature in accordance to one embodiment. At point 82, the inverter 12 may provide the maximum power limit that the inverter 12 is capable of providing, for example, 425 W to the power consumer electronic devices 18 when the ambient temperature about the inverter 12 is detected to be between −50 C.° to 60 C.°. Once the inverter 12 detects that the temperature has exceeded a predetermined temperature value, then the inverter 12 may reduce the maximum power output (or decrease the AC output voltage) to prevent the electronic circuitry within the inverter 12 from malfunctioning. It should be recognized that the inverter 12 will continue to provide the AC output voltage to charge/power the power consumer electronic device 18 but at a reduced level from the maximum power level that the inverter 12 is capable of providing once the temperature exceeds the predetermined temperature value. The inverter 12 will deliver the minimum amount of power that it is commanded to provide. If the body control module 14 commands the inverter 12 to provide 400 W, but the ambient temperature within the inverter 12 is high (e.g., the detected temperature corresponds to a 200 W capability) than the inverter 12 will provide 200 W of output power. The inverter 12 can also control the power output based on the amount of voltage that is being provided by the battery 16 even if the power output differs from the amount that is being requested by the body control module 14. For example, in the event the body control module 14 commands the inverter 12 to provide 300 W, but the inverter 12 detects, based on the voltage being provided to the battery 16 that it is necessary to limit the power output due to a low voltage being output by the battery 16, then the inverter 12 may provide a power output of, for example, 150 W. The inverter 12 provides an offset to compensate for variations in the ambient temperature. For example, the thermistor 42 may be positioned on a printed circuit board (PCB) and to a connector bracket. Such positioning of the thermistor 42 on the PCB and connector bracket may cause the thermistor 42 to detect a higher temperature value. In this case, the inverter 12 may offset (or reduce) the temperature detected by the thermistor 42 by a predetermined amount (e.g., 10 C) to compensate for this condition.

Figure 4A:
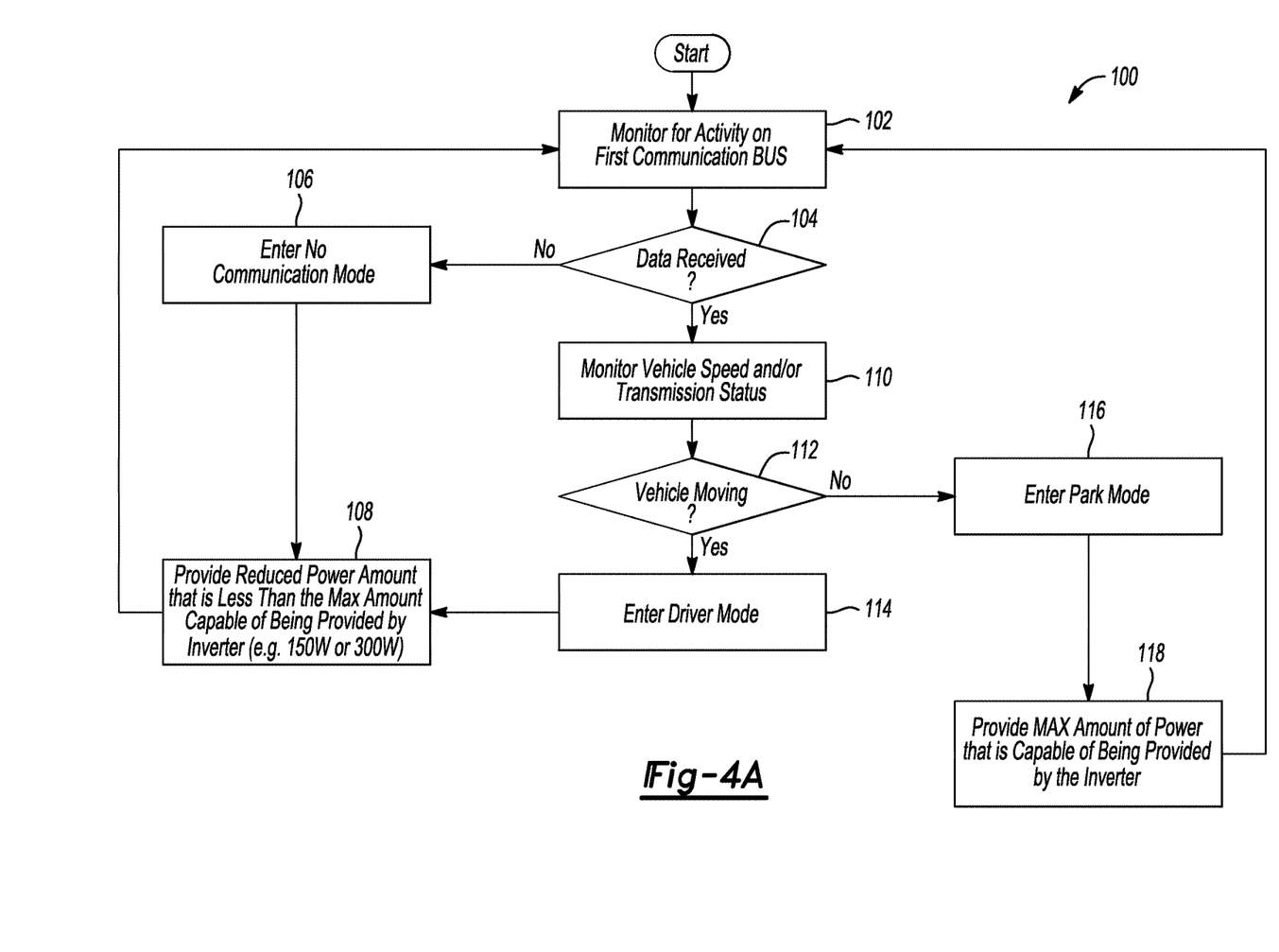
FIGS. 4a-4c depicts a method for controlling an output from the inverter based on various vehicle modes and/or vehicle status in accordance to one embodiment.

FIG. 4a depicts a method 100 for controlling the power output of the inverter 12 based on various vehicle modes and/or vehicle status in accordance to one embodiment.

In operation 102, the inverter 12 monitors the first communication bus 20 for receipt of data from the body control module 14 (or from any other module that the inverter 12 may be electrically coupled to via the first communication bus 20).

In operation 104, the inverter 12 determines whether any data has been received over the first communication bus 20. If no data has been received, then the method 100 moves to operation 106. If data has been received, then the method 100 moves to operation 110.

In operation 106, the inverter 12 moves into a "no communication mode." The no communication mode indicates that the inverter 12 is unable to receive data over the first communication bus 20.

In operation 108, the inverter 12 outputs AC power that is less than the maximum power limit amount that the inverter 12 is programmed to support (or that the inverter 12 is capable of supporting). For example, if the inverter 12 is configured to output a maximum power amount of approximately 400 W, then the inverter 12 while in operation 108, may output 150 W to the power consumer electronic device 18. While in the no communication mode, the inverter 12 provides a small amount of AC power to the power consumer electronic devices 18 to ensure that the user can power/charge the power consumer electronic device 18 for a predetermined amount of time (e.g., 15 minutes or other suitable time period). Once the inverter 12 determines that the predetermined amount of time has expired, the inverter 12 may stop providing the AC power. Because the inverter 12 is not receiving data on the first communication bus 20, it is desirable to simply provide some limited amount of power for a small period of time. The fact the inverter 12 is not receiving data on the first communication bus 20 indicates that the vehicle electrical system is experiencing a failure mode.

In operation 110, the body control module 14 monitors vehicle speed and/or transmission status. It is recognized that the inverter 12 may be used instead of the body control module 14 to monitor vehicle speed and/or transmission status.

In operation 112, the body control module 14 determines whether the vehicle is moving based on the vehicle speed exceeding a predetermined vehicle speed or based on the transmission status of the vehicle indicating that the vehicle is not in park (or alternatively if the park brake is engaged/disengaged). If this condition is true (e.g., vehicle is moving), then the method 100 moves to operation 114. If this condition is false (e.g., vehicle is not moving), then the method 100 moves to operation 116. It is recognized that the inverter 12 may be used instead of the body control module 14 to determine whether the vehicle is moving. In this case, the inverter 12 may simply receive the vehicle speed and/or transmission status from other module(s) in the vehicle and make the determination as to whether the vehicle is moving or not moving.

In operation 114, the inverter 12 moves into a drive mode (e.g., vehicle is moving) in response to information from the body control module 14 (i.e., if the body control module 14 performs the operation 112) that indicates that the vehicle is moving. Again, it is recognized that the inverter 12 may move into the drive mode independent of the body control module 14 if it determines that the vehicle is in the drive mode based on the criteria noted above (e.g., vehicle speed and/or transmission status).

In operation 108, the inverter 12 outputs an AC power that is less than the maximum power limit amount that the inverter 12 is programmed or capable to support. For example, if the inverter 12 is configured to output a maximum power amount of 400 W, then the inverter 12 while in operation 108, may output 300 W to the power consumer electronic devices 18. While in the drive mode, the inverter 12 provides a significant amount of AC power to the power consumer electronic device 12 to power/charge the same. In the drive mode, it is desirable to provide a relatively large amount of AC power but not necessarily the maximum power amount that the inverter 12 is capable of providing to avoid negatively impacting the operation of other vehicle subsystems such as start/stop operation or to avoid the possibility of exceeding the total current capacity provided by the vehicle alternator.

In operation 116, the inverter 12 enters into a park mode (e.g., vehicle is not moving) in response to information from the body control module 14 (i.e., if the body control module 14 performs the operation 112). Again, it is recognized that the inverter 12 may move into the park mode independent of the body control module 14 if it determines that the vehicle is in the park mode based on the criteria noted above.

In operation 118, the inverter 12 outputs (or provides) the AC power at the maximum amount (i.e., the maximum amount the inverter 12 is capable of providing) to the power consumer electronic device 18. In this case, since the vehicle is parked (the engine may or may not be running) and it is desirable to provide the maximum AC power (e.g., approximately 440 W) to the power consumer electronic devices 18 as the likelihood of negatively impacting the functionality of other vehicle system are mitigated since the vehicle may not be drawing higher current amounts from the alternator or higher voltage amounts from the battery 16 when the vehicle is parked and not moving. Furthermore, it is desirable to provide the maximum AC power in the parked mode to power the power consumer electronic devices 18 when it is likely that in this mode, a user will require more power from the vehicle to power/charge various power consumer electronic devices 18 (e.g., kitchen appliances while tailgating or tools while vehicle parked at work site etc.).

Figure 4B:
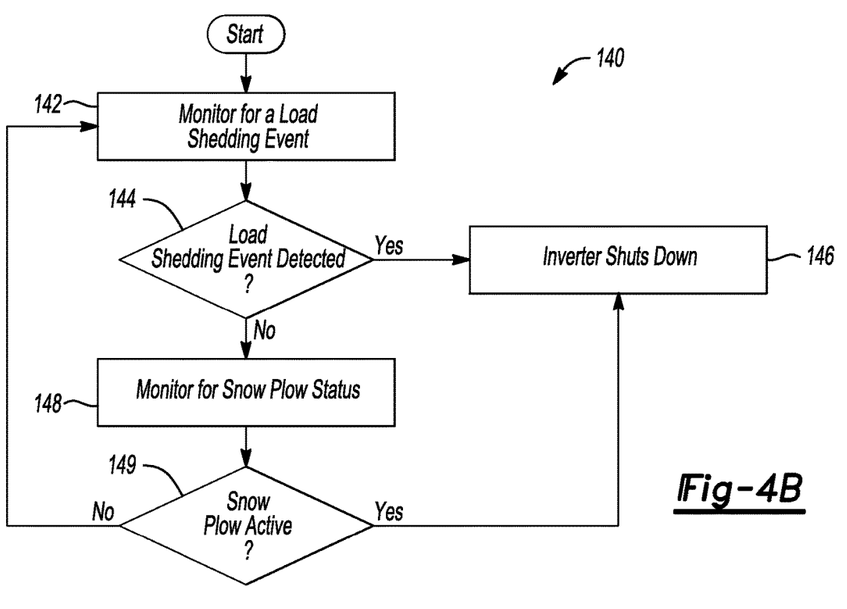

FIG. 4b depicts another method 140 for controlling the power output of the inverter 12 based on various vehicle modes and/or vehicle information in accordance to one embodiment.

In operation 142, the body control module 14 transmits information indicative of whether an alternator in the vehicle is undergoing a load shedding event in order to preserve power for essential vehicle operations. In other words, in moments of high current consumption/demand by various electronics in the vehicle, current may be reduced and solely used to power essential electronics within the vehicle to ensure that the vehicle remains driveable. Non-essential vehicle operations may be shut down at this time.

In operation 144, the inverter 12 determines whether the vehicle is undergoing a load shedding event based on the information provided by the body control module 14 via the first communication bus 20. If this condition is true, then the method 140 moves to operation 146. If not, then the method 140 moves to operation 148.

In operation 146, the inverter 12 shuts down and stops transmitting output power to the power electronic consumer devices 18.

In operation 148, the body control module 14 transmits information indicative of whether the vehicle is using a snow plow. In this case, the body control module 14 is generally coupled to a controller that monitors whether the vehicle has engaged a snow plow for the purpose of removing snow. When active, the controller transmits information to the body control module 14 to indicate that the snow plow is active. The body control module 14 subsequently transmits information to the inverter 12 that indicates whether the vehicle has engaged the snow plow. Because the large amount of power needed to operate the snow plow, it may be desirable to avoid charging the power consumer electronic devices 18 when the snow plow is engaged.

In operation 149, the inverter 12 determines whether the vehicle has engaged or activated the snow plow. If this condition is true, then the method 120 moves to operation 146 where the inverter 12 shuts down and stops transmitting output power to the power consumer electronic devices 18. If not, then the method 140 returns to operation 142.

It is recognized that operations 148 and 149 may be performed independently of operations 142 and 144. Such operations are illustrated together in the method 140 to reflect that the end result will lead to the inverter 12 shutting down if the noted conditions are true. It is further recognized that inverter 12 itself may be used instead of the body control module 14 to receive status of the load shedding event or of the activation of the snow plow. For example, the inverter 12 may be directly coupled to various controllers to receive such information without the need for the body control module 14 to relay such information to the inverter 12.

Figure 4C:
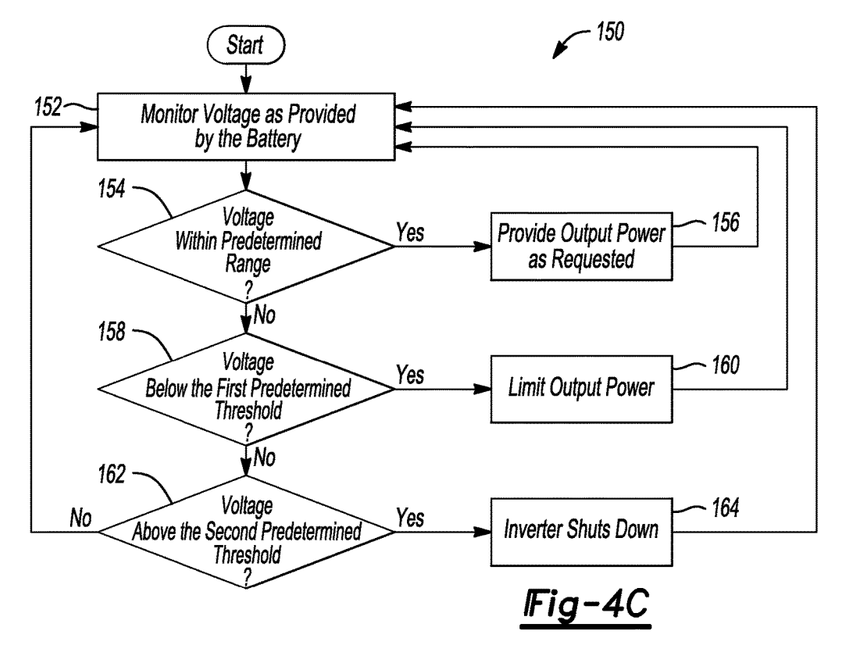

FIG. 4c depicts another method 150 for controlling a power output of the inverter 12 based on various vehicle modes and/or vehicle information in accordance to one embodiment.

In operation 152, the inverter 12 monitors the amount of voltage being provided by the battery 16 (either via receipt of information from the body control module 14 or via an input thereof as noted above).

In operation 152, the inverter 12 determines whether the voltage from the battery 16 is within a predetermined voltage range. For example, the predetermined voltage range may comprise a voltage range of between 11 and 16V. If this condition is true, then the method 150 proceeds to operation 156. If not, then the method 150 proceeds to operation 158.

In operation 156, the inverter 12 provides the power output as requested to the power consumer electronic devices 18 as the voltage from the battery 16 is determined to be within an acceptable range.

In operation 158, the inverter 12 determines whether the voltage from the battery 16 is below the first predetermined threshold (e.g., 11V which is the low end of the predetermined voltage range). If this condition is true, then the method 150 proceeds to operation 160. If not, then the method 150 proceeds to operation 162.

In operation 160, the inverter 12 limits the amount of output power that is being provided to the power consumer electronic devices 18 to protect wiring within the vehicle from experiencing increased levels of current during a low voltage condition.

In operation 162, the inverter 12 determines whether the voltage from the battery 16 is above the first predetermined threshold (e.g., 16V which is the high end of the predetermined voltage range). If this condition is true, then the method 150 proceeds to operation 164. If not, then the method 150 proceeds back to operation 152.

In operation 164, the inverter 12 shuts down and stops transmitting output power to the power consumer devices 18.

Figure 5:
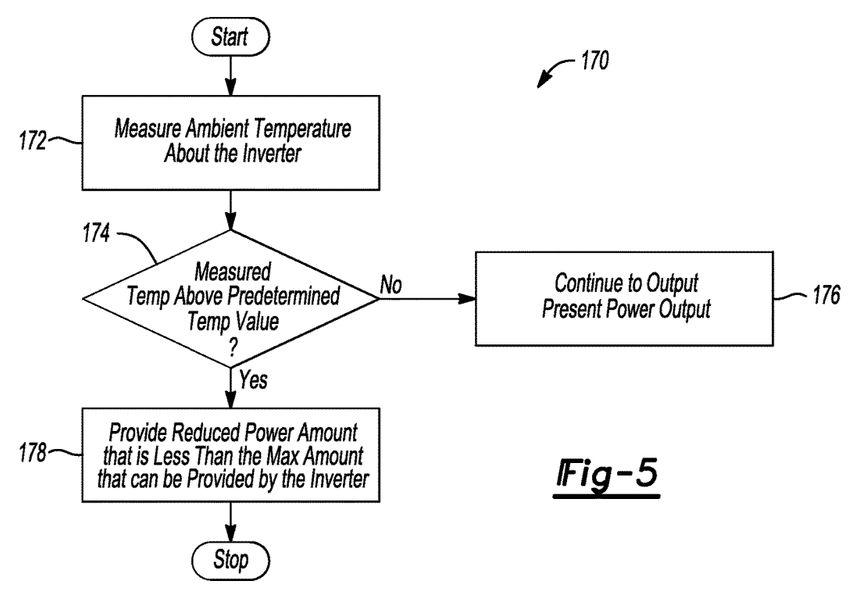
FIG. 5 depicts a method for controlling an output from the inverter based on measured temperature about the inverter in accordance to one embodiment.

FIG. 5 depicts a method 170 for controlling an output from the inverter 12 based on measured temperature in accordance to one embodiment.

In operation 172, the inverter 12 measures the ambient temperature via the thermistor 42 thereof.

In operation 174, the inverter 12 determines whether the measured ambient temperature exceeds the predetermined temperature value. If this condition is not true, then the method 170 moves to operation 176. If this condition is true, then the method 170 moves to operation 178.

In operation 176, the inverter 12 outputs the AC power to the power consumer electronic devices 18 based on the detected vehicle mode (e.g., see parked mode or drive mode).

In operation 178, the inverter 12 decreases the amount of AC power that is being provided to the power consumer electronic devices 18 to minimize damage to circuitry within due to the inverter 12 experiencing a high temperature condition.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising
a vehicle inverter programmed to:
  invert a direct current (DC) input into a maximum alternating current (AC) output to power at least one external load;
  receive first information indicative of whether a vehicle is in one of a drive mode and a park mode;
  provide the maximum AC output to power the at least one external load in response to the first information indicating that the vehicle is in the park mode; and
  invert the DC input into a first AC output that is less than the maximum AC output to power the at least one external load in response to the first information indicating that the vehicle is in the drive mode.

2. The apparatus of claim 1 wherein the vehicle inverter is further programmed to receive the first information on a data communication bus.

3. The apparatus of claim 2 wherein the first information as received on the data communication bus corresponds to at least one of vehicle speed and transmission status.

4. The apparatus of claim 1 wherein the maximum AC output is approximately 400 W.

5. The apparatus of claim 1 wherein the vehicle inverter is further programmed to invert the DC input into a second AC output that is less than the maximum AC output to power the at least one external load in the event the first information is not received at the inverter.

6. The apparatus of claim 5 wherein the vehicle inverter is further programmed to invert the DC input into the second AC output for a predetermined amount of time.

7. The apparatus of claim 1 wherein the inverter is further programmed to determine whether the DC input as provided from a battery is within a predetermined voltage range that includes a first predetermined threshold and a second predetermined threshold, the second predetermined threshold being greater than the first predetermined threshold.

8. The apparatus of claim 7 wherein the inverter is further programmed to invert the DC input into a second AC output that is less than the maximum AC output to power at least one external in response to the DC input being less than the first predetermined threshold.

9. The apparatus of claim 7 wherein the inverter is further programmed to disable inverting the DC input in response to the DC input being greater than the second predetermined threshold.

10. The apparatus of claim 1 wherein the vehicle inverter includes a thermistor to measure an ambient temperature within the vehicle inverter to generate a measured ambient temperature.

11. The apparatus of claim 10 wherein the vehicle inverter is further programmed to invert the DC input into a second AC output that is less than the maximum AC output to power the at least one external load in response to the measured ambient temperature being greater than a predetermined temperature value.

12. The apparatus of claim 1 wherein the vehicle inverter is further programmed to receive second information indicative of the vehicle undergoing a snow plow event.

13. The apparatus of claim 12 wherein the vehicle inverter is further programmed to stop inverting the DC input in response to the second information indicating that the vehicle is undergoing the snow plow event.

14. A method comprising:
  inverting a direct current (DC) input into a maximum alternating current (AC) output to power at least one external load;
  receiving information indicative of whether a vehicle is in one of a drive mode and a park mode;
  providing the maximum AC output to power the at least one external load in response to the information indicating that the vehicle is in the park mode; and inverting the DC input into a first AC output that is less than the maximum AC output to power the at least one external load in response to the information indicating that the vehicle is in the drive mode.

15. The method of claim 14 further comprising wherein receiving the information further comprises receiving the information on a data communication bus.

16. The method of claim 15 wherein the information as received on the data communication bus corresponds to at least one of vehicle speed and transmission status.

17. The method of claim 14 further comprising inverting the DC input into a second AC output that is less than the maximum AC output to power the at least one external load in the event the information is not received at the inverter.

18. The method of claim 17 further comprising inverting the DC input into the second AC output for a predetermined amount of time.

19. The method of claim 14 wherein the maximum AC output is approximately 400 W.

* * * * *

UNITED STATES PATENT AND TRADEMARK OFFICE
CERTIFICATE OF CORRECTION

PATENT NO. : 10,186,896 B2
APPLICATION NO. : 14/473276
DATED : January 22, 2019
INVENTOR(S) : Krzysztof Klesyk et al.

Page 1 of 1

It is certified that error appears in the above-identified patent and that said Letters Patent is hereby corrected as shown below:

In the Claims

Column 12, Lines 35-36, Claim 8:
After "at least one external"
Insert -- load --.

Signed and Sealed this
Twenty-eighth Day of May, 2019

Andrei Iancu
*Director of the United States Patent and Trademark Office*